United States Patent
Nohara et al.

(10) Patent No.: US 6,515,055 B1
(45) Date of Patent: Feb. 4, 2003

(54) RUBBER COMPOSITION

(75) Inventors: Daisuke Nohara, Kodaira (JP); Jingo Shirasaka, Kodaira (JP); Akinori Oka, Tokushima (JP); Ken Sonogi, Tokushima (JP); Hiroaki Tokuda, Tokushima (JP)

(73) Assignees: Bridgestone Corporation, Tokyo (JP); Otsuka Chemical Co., Ltd., Osaka (JP)

( * ) Notice: Subject to any disclaimer, the term of this patent is extended or adjusted under 35 U.S.C. 154(b) by 98 days.

(21) Appl. No.: 09/714,507

(22) Filed: Nov. 17, 2000

(30) Foreign Application Priority Data

Nov. 17, 1999 (JP) .............................. 11-326923

(51) Int. Cl.$^7$ ............................ C08K 5/25; C08K 5/29; C08L 7/00; C08L 21/00

(52) U.S. Cl. ..................... 524/191; 524/194; 524/186; 524/231

(58) Field of Search ............................... 524/186, 231, 524/191, 194

(56) References Cited

U.S. PATENT DOCUMENTS

| | | | | | |
|---|---|---|---|---|---|
| 3,781,250 A | * | 12/1973 | Wolpers | ................ | 260/79.5 B |
| 5,210,152 A | * | 5/1993 | Musch et al. | ................ | 525/368 |
| 5,866,171 A | | 2/1999 | Kata | ............................ | 425/46 |
| 5,876,527 A | | 3/1999 | Tsuruta et al. | ............... | 152/541 |
| 5,931,211 A | | 8/1999 | Tamura | .................... | 152/209.5 |
| 5,971,046 A | | 10/1999 | Koch et al. | .............. | 152/125.1 |

FOREIGN PATENT DOCUMENTS

| | | | | |
|---|---|---|---|---|
| EP | 0 433 808 A2 | | 6/1991 | ............. C08K/5/29 |
| EP | 0 905 163 A1 | | 3/1999 | ........... C08G/18/62 |
| EP | 905163 | * | 3/1999 | ........... C08G/18/62 |
| EP | 909788 | * | 4/1999 | ........... C08L/21/00 |
| EP | 0 909 788 A1 | | 4/1999 | ........... C08L/21/00 |
| EP | 1 000 968 A1 | | 5/2000 | ............. C08K/5/39 |
| JP | 57177045 | * | 10/1982 | .................. 524/186 |
| JP | 01306442 | | 12/1989 | .................... 524/96 |
| SU | 765310 | * | 9/1980 | ........... C08K/5/16 |
| WO | WO 98/44040 | * | 8/1998 | ........... C08L/21/00 |

* cited by examiner

*Primary Examiner*—David W. Wu
*Assistant Examiner*—Kelechi Egwim
(74) *Attorney, Agent, or Firm*—Sughrue Mion, PLLC

(57) ABSTRACT

Provided is a rubber composition comprising 100 parts by weight of a rubber component comprising at least one selected from the group consisting of natural rubber and synthetic rubbers and 0.05 to 20 parts by weight of at least one selected from compounds (A) represented by the following Formula (I):

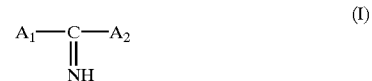

wherein $A_1$ and $A_2$ each represent R—, R—NH—, R—X—NH—, R—NH—NH— or R—X—NH—NH—, and $A_1$ and $A_2$ may be the same or different; R represents any one of a hydrogen atom, an alkyl group having 1 to 18 carbon atoms which may be branched, a cycloalkyl group, an aryl group, an alkylaryl group or an alkenyl group, each group of which may include at least one substituent containing a sulfur atom, a nitrogen atom and an oxygen atom, and two R's may be combined in a molecule to form a ring containing a >C=NH bond; and X represents any one of those shown below:

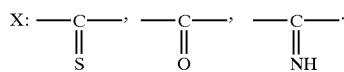

5 Claims, No Drawings

RUBBER COMPOSITION

BACKGROUND OF THE INVENTION

1. Field of the Invention

The present invention relates to a rubber composition which is excellent in heat aging resistance.

2. Description of the Related Art

Heat aging of rubber is caused according to an auto-oxidation mechanism of polymers which is generally known, and therefore it is effective for preventing heat aging to inactivate peroxy radicals produced in this course.

In general, diphenyldiamine based compounds and hindered phenol based compounds have so far been used as an antioxidant. These compounds give "H" in ">NH" and "—OH" to peroxy radicals produced in the course of auto-oxidative degradation to inactivate them, and the compounds themselves change to stable compounds through more stable radicals. Thus, widely known is a method in which peroxy radicals are inactivated to terminate a radical chain reaction to thereby prevent aging.

Both the conventional diphenyldiamine based antioxidants and hindered phenol based antioxidants described above have an aging preventing action. In general, as the blending amount thereof is increased, an aging preventing effect grows large correspondingly in an area where the blending amount is small, but when they are used in a large amount, an increment in the effect becomes gradually small. The effect is even reduced due to bloom in a certain case, and therefore involved is the problem that the optimum use amount has to be set.

Further, a rubber composition using a diphenylamine based antioxidant has a large change rate in an elastic modulus before and after degradation, and the rubber composition is notably hardened and reduced in its physical properties in a certain case depending on the blending recipe of the rubber composition and the conditions of degradation.

In light of the problems of the conventional techniques described above, an object of the present invention is to solve the problems and to provide a rubber composition which is excellent in heat aging resistance without causing a reduction in physical properties.

SUMMARY OF THE INVENTION

Intensive researches repeated by the present inventors in order to solve the problems of the conventional technique described above have resulted in successfully obtaining a rubber composition meeting the object described above by blending a specific amount of a specific compound with a rubber component comprising at least one selected from the group consisting of natural rubber and synthetic rubbers, and thus the invention has been completed.

That is, the rubber composition of the present invention relates to the following compositions (1) to (8):

(1) A rubber composition comprising 100 parts by weight of a rubber component comprising at least one selected from the group consisting of natural rubber and synthetic rubbers and 0.05 to 20 parts by weight of at least one selected from compounds (A) represented by the following Formula (I):

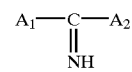

wherein $A_1$ and $A_2$ each represent R—, R—NH—, R—X—NH—, R—NH—NH— or R—X—NH—NH—, and $A_1$ and $A_2$ may be the same or different; R represents any one of a hydrogen atom, an alkyl group having 1 to 18 carbon atoms which may be branched, a cycloalkyl group, an aryl group, an alkylaryl group or an alkenyl group, each group of which may include at least one substituent containing a sulfur atom, a nitrogen atom and an oxygen atom, and two R's may be combined in a molecule to form a ring containing a >C=NH bond; and X represents any one of those shown below:

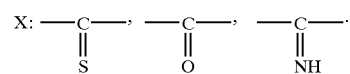

(2) The rubber composition as described in the above item (1), wherein the compound (A) represented by Formula (I) described above is a compound represented by the following Formula (II):

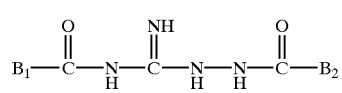

wherein $B_1$ and $B_2$ each represent

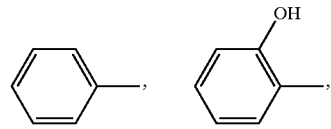

a hydrogen atom or an alkyl group having 1 to 18 carbon atoms which may be branched, and $B_1$ and $B_2$ may be the same or different.

(3) The rubber composition as described in the above item (2), wherein the compound represented by Formula (II) is N'-(N-benzoylamidino)benzoic acid hydrazide.

(4) The rubber composition as described in the above item (3), wherein the compound (A) represented by Formula (I) described above is a compound represented by the following Formula (III):

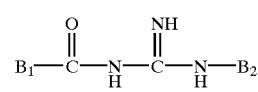

wherein $B_1$ and $B_2$ each represent

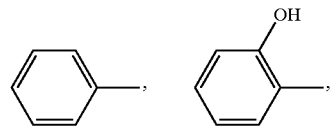

a hydrogen atom or an alkyl group having 1 to 18 carbon atoms which may be branched, and $B_1$ and $B_2$ may be the same or different.

(5) The rubber composition as described in the above item (4), wherein the compound represented by Formula (III) is N-amidinobenzamide.

(6) The rubber composition as described in any of the above items (1) to (5), further comprising an antioxidant, wherein the antioxidant is at least one selected from the group consisting of antioxidants of a naphthylamine base, a p-phenylenediamine base, a hydroquinone derivative, a monophenol base, a bisphenol base, a trisphenol base, a polyphenol base, a diphenylamine base, a quinoline base, a thiobisphenol base and a hindered phenol base.

(7) The rubber composition as described in the above item (6), wherein the antioxidant described above is at least one selected from the group consisting of antioxidants of a p-phenylenediamine base and a diphenylamine base.

(8) The rubber composition as described in the above item (5) or (6), wherein an amount of the antioxidant described above is 0.1 to 5.0 parts by weight per 100 parts by weight of the rubber component.

A rubber composition which is better in heat aging resistance is provided by using at least one selected from the compounds (A) represented by Formula (I) in combination with an antioxidant.

DESCRIPTION OF THE PREFERRED EMBODIMENTS

The present invention shall be explained below in detail.

The rubber composition of the present invention is characterized by comprising 100 parts by weight of a rubber component comprising at least one selected from the group consisting of natural rubber and synthetic rubbers and 0.05 to 20 parts by weight of at least one selected from the compounds (A) represented by the following Formula (I):

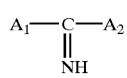

(I)

wherein $A_1$ and $A_2$ each represent R—, R—NH—, R—X—NH—, R—NH—NH— or R—X—NH—NH—, and $A_1$ and $A_2$ may be the same or different.

Above R is any one of a hydrogen atom, an alkyl group having 1 to 18 carbon atoms which may be branched, a cycloalkyl group, an aryl group, an alkylaryl group or an alkenyl group (these groups include a group having at least one substituent containing a sulfur atom, a nitrogen atom and an oxygen atom), and two R's may be combined in a molecule to form a ring containing a>C=NH bond.

X represents any one of those shown below:

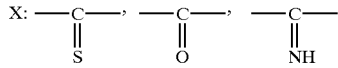

The compound (A) represented by Formula (I) used in the present invention is used as a novel heat aging preventive. Although an action mechanism thereof is not sufficiently made clear, it is considered that ">NH" is contained in the structure thereof as is the case with conventional diphenylamine base antioxidants and therefore gives a proton to peroxy radicals produced in the course of an auto-oxidation of the rubber composition to stabilize, whereby the aging preventing action is displayed (this point shall further be explained in examples described later).

The compound (A) represented by Formula (I) includes, for example, various compounds shown in the following items (1) to (14).

(1) When $A_1$ and $A_2$ are R—, included are, for example, ethaneimine, benzylimine, acetoneimine, acetophenoneimine and benzophenoneimine.

(2) When $A_1$ is R— and $A_2$ is R—NH—, included are, for example, benzoamidine, acetoamidine, 1-phenylbenzoamidine, 1-methylbenzoamidine and 1-phenylacetoamidine.

(3) When $A_1$ is R— and $A_2$ is R—X—NH—, included are, for example, 1-benzoylbenzoamidine, 1-acetylbenzoamidine and 1-benzoylacetoamidine.

(4) When $A_1$ and $A_2$ are R—NH—, included are, for example, guanidine, 1-phenylguanidine, 1-methylguanidine, 1,3-diphenylguanidine, 1,3-dipropylguanidine and 1-phenyl-3-methylguanidine.

(5) When $A_1$ is R—NH— and $A_2$ is R—X—NH—, included are, for example, N-amidinobenzamide, N-amidinoacetoamide, N'-(N-phenylamidino)benzamide, N'-(N-phenylamidino)acetoamide, N'-(N-phenylamidino)stearamide, N'-(N-methylamidino)benzamide and biguanide.

(6) When $A_1$ and $A_2$ are R—X—NH—, included are, for example, 1,3-dibenzoylguanidine, 1,3-diacetylguanidine and 1-acetyl-3-benzoylguanidine.

(7) When $A_1$ is R— and $A_2$ is R—NH—NH—, included are, for example, benzohydrazideimine, acetohydrazideimine, 2-phenylbenzohydrazideimine, 2-methylbenzohydrazideimine and 2-phenylacetohydrazideimine.

(8) When $A_1$ is R— and $A_2$ is R—X—NH—NH—, included are, for example, 2-benzoylbenzohydrazideimine, 2-acetylbenzo-hydrazideimine, 2-benzoylacetohydrazideimine and 2-amidinobenzohydrazideimine.

(9) When $A_1$ is R—NH— and $A_2$ is R—NH—NH—, included are, for example, aminoguanidine, 1-amino-2-phenylguanidine, 1-amidino-2-phenylhydrazine, 1-phenyl-2-(N-phenyl-amidino)hydrazine, 1-methyl-2-(N-phenylamidino)hydrazine and 1-phenyl-2-(N-methylamidino)hydrazine.

(10) When $A_1$ is R—NH— and $A_2$ is R—X—NH—NH—, included are, for example, N'-amidinobenzoic acid hydrazide, N'-amidinooctanoic acid hydrazide, N'-(N-phenylamidino)benzoic acid hydrazide, N'-(N-methylamidino)benzoic acid hydrazide, N'-(N-phenylamidino)acetohydrazide and N'-(N-phenylamidino)octanoic acid hydrazide.

(11) When $A_1$ is R—X—NH— and $A_2$ is R—X—NH—NH—, included are, for example, N'-(N-benzoylamidino)benzoic acid hydrazide, N'-(N-octanoylamidino)octanoic acid hydrazide, N'-(N-acetylamidino)benzoic acid hydrazide, N'-(N-benzoylamidino)propionic acid hydrazide, N'-(N-benzoylamidino)octanoic acid hydrazide and N'-(N-benzoylamidino)stearic acid hydrazide.

(12) When $A_1$ and $A_2$ are R—NH—NH—, included are, for example, carbohydrazideimine, 1,5-diphenylcarbohydrazideimine and 1,5-dimethylcarbohydrazideimine.

(13) When $A_1$ is R—NH—NH— and $A_2$ is R—X—NH—NH—, included are, for example, 1-benzoyl-5-phenylcarbohydrazideimine, 1-acetyl-5-phenylcarbohydrazideimine and 1-benzoyl-5-methylcarbohydrazideimine.

(14) When $A_1$ and $A_2$ are R—X—NH—NH—, included are, for example, 1,5-dibenzoylcarbohydrazideimine, 1,5-diacetylcarbohydrazideimine and 1,5-dioctanoylcarbohydrazideimine.

In the various compounds of the items (1) to (14) described above, those in which structural double bond isomers are present shall not be restricted only to one isomer.

These compounds (A) can be used alone or in a mixture of two or more kinds thereof.

The compound (A) represented by Formula (I) described above used in the present invention is preferably the compound represented by the following Formula (II) or (III):

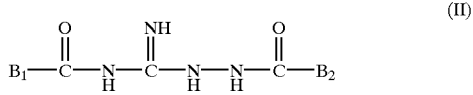
(II)

wherein $B_1$ and $B_2$ each represent

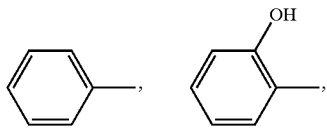

a hydrogen atom or an alkyl group having 1 to 18 carbon atoms which may be branced, and $B_1$ and $B_2$ may be the same or different;

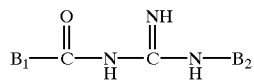
(III)

wherein $B_1$ and $B_2$ each represent

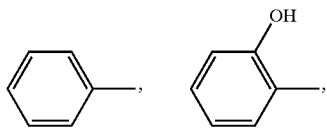

a hydrogen atom or an alkyl group having 1 to 18 carbon atoms which may be branched, and $B_1$ and $B_2$ may be the same or different.

To be specific, the compound (A) is preferably N'-(N-benzoylamidino)benzoic acid hydrazide in Formula (II) and N-amidinobenzamide in Formula (III). In these cases, better heat aging preventive action is displayed.

These compounds (A) can be relatively easily synthesized by reacting readily available raw materials such as ketones, amines, nitrites, hydrazines, hydrazides, guanidines, aminoguanidines and iminoethers with each other, or reacting these compounds with suitable reactants. The specific synthetic examples shall further be explained in examples.

A content of at least one of the compounds (A) represented by Formula (I) described above used in the present invention is 0.05 to 20 parts by weight, preferably 0.1 to 5.0 parts by weight and more preferably 0.5 to 3.0 parts by weight per 100 parts by weight of the rubber component.

If the amount of the compound (A) described above falls in a range of 0.05 to 20 parts by weight, the intended heat aging preventing effect is exhibited without bringing about a reduction in the other physical properties and a rise in the cost.

In the present invention, at least one of the various compounds described above is used in combination with an antioxidant which is conventionally used in the rubber industry, whereby better heat aging preventing action is displayed.

It has so far been known that when two or more kinds of antioxidants are used in combination, a synergistic effect is exhibited depending on the combination of the antioxidants used, and it is widely known that the kind of this synergistic effect includes homosynergism which takes place when two or more kinds of antioxidants themselves of a peroxy radical scavenger type are used in combination, and heterosynegism which takes place when antioxidants having different action mechanisms are used in combination, for example, when antioxidants of a peroxy radical scavenger type are combined with antioxidants of a peroxide decomposer type. In the present invention, various kinds of the preceding compounds (A) are, as described above, the antioxidants of a peroxy radical scavenger type, and when they are used in combination with other conventional antioxidants of a peroxy radical scavenger type such as a diphenyldiamine base and a hindered phenol base, the former homosynergism is revealed. As a result, displayed is the specific effect that the larger effect is obtained in a smaller amount in the case of using the compound (A) in combination with the conventional antioxidants of a diphenyldiamine base and a hindered phenol base rather than in the case of using the conventional antioxidants alone in a large amount.

Rubber composition using this compound (A) is less deteriorated in the elastic modulus before and after degradation than rubber composition blending a diphenyldiamine based antioxidant.

Given as the antioxidants used in combination are a naphthylamine base, a p-phenylenediamine base, a hydroquinone derivative, a monophenol base, a bisphenol base, a trisphenol base, a polyphenol base, a diphenylamine base, a quinoline base, a thiobisphenol base and a hindered phenol base. Among them, amine based antioxidants of a p-phenylenediamine base and a diphenylamine base are preferred in terms of the higher aging preventing effect.

The antioxidants of a p-phenylenediamine base include, for example, N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methyl-heptyl)-p-phenylenediamine, N,N'-bis(1,4-dimethylpentyl)-p-phenylenediamine, N,N'-bis(1-ethyl-3-methylpentyl)-p-phenylenediamine and N-(1,3-dimethylbutyl)-N'-phenyl-p-phenylenediamine. Among them, N-(1,3-dimethylbutyl)-N'-phenyl-p-phenylenediamine is most preferred in terms of the higher aging preventing effect.

The antioxidants of a diphenylamine base include, for example, 4,4'-(α-methylbenzyl)diphenylamine, 4,4'-(α, α-dimethylbenzyl)diphenylamine, p-(p-toluene-sulfonylamide)diphenylamine and 4,4'-dioctyldiphenyamine. Among them, 4,4'-(α-methylbenzyl)diphenylamine is most preferred in terms of the higher aging preventing effect.

The antioxidants used in combination with the compound (A) represented by Formula (I) described above can be used alone or in combination of two or more kinds thereof, and they are used in a range of 0.1 to 5.0 parts by weight, preferably 0.2 to 3.0 parts by weight per 100 parts by weight of the rubber component.

When a content of the compound described above falls in a range of 0.1 to 5.0 parts by weight, the higher aging preventing effect is exhibited without causing bloom on a surface of a rubber article and a reduction in other physical properties.

The rubber component used in the present invention is natural rubber and/or synthetic rubbers. The synthetic rubbers include, for example, cis-1,4-polyisoprene, styrene-butadiene copolymers, 1,4-polybutadiene, ethylenepropylene-diene copolymers, polychloroprene, halogenated butyl rubber and acrylonitrile-butadiene rubber. At least one of them can be used, and natural rubber or diene base synthetic rubber is preferably used.

In the present invention, capable of being suitably blended, if necessary, in addition to the compounds described above are compounding ingredients usually used in the rubber industry, for example, reinforcing fillers such as carbon black and silica, process oil, other antioxidants than the antioxidants described above, vulcanization-accelerators, acceleration activators such as stearic acid and zinc white, and vulcanizing agents such as sulfur.

The reinforcing fillers include, for example, carbon black, silica, calcium carbonate and titanium oxide, and among them, carbon black is preferred. One usually used in the rubber industry can suitably be used as carbon black. In particular, carbon black of HAF, ISAF or SAF grade is preferred.

An amount of the reinforcing filler is preferably 20 to 150 parts by weight per 100 parts by weight of the rubber component.

The process oil which can be used includes, for example, a paraffin base, a naphthene base and an aromatic base.

The vulcanization-accelerators which can be used shall not specifically be restricted and include thiazoles such as mercaptobenzothiazole and dibenzothiazyldisulfide, sulfenamides such as N-cyclohexyl-2-benzothiazolylsulfenamide, N,N'-dicyclohexyl-2-benzothiazolylsulfeneamide and N'-t-butyl-2-benzothiazolyl-sulfenamide, and guanidines such as diphenylguanidine. The blending amount thereof is preferably 0.1 to 5 parts by weight per 100 parts by weight of the rubber component.

The acceleration activators shall not specifically be restricted and include stearic acid and zinc white.

Vulcanizing agents usually used in the rubber industry can suitably be used and include sulfur and peroxides, and sulfur is preferred. A blending amount of the vulcanizing agent is preferably 0.5 to 8.0 parts by weight, more preferably 0.5 to 5.0 parts by weight per 100 parts by weight of the rubber component. When the amount of the vulcanizing agent falls in a range of 0.5 to 8.0 parts by weight, vulcanization is sufficiently carried out. In addition thereto, the scorching time can be extended, and rubber does not get scorched during kneading.

The rubber composition of the present invention can be used for industrial articles such as rubber vibration insulators, belts and hoses as well as tire materials such as tire treads, under treads, carcasses, side walls and beads. It is used preferably for tire treads.

Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

EXAMPLES

The present invention shall more specifically be explained below in further details with reference to synthetic examples, examples and comparative examples, but the present invention shall not be restricted to these examples.

Synthetic Examples 1 to 5

Synthesized by the following methods were five kinds of compounds of N'-(N-benzoylamidino)benzoic acid hydrazide, N-amidinobenzamide, 1-benzoylacetoamidine, 2-benzoylaceto-hydrazideimine and 1,5-dioctanoylcarbohydrazideimine which were representative compounds among the compounds (A) in the present invention.

Unless otherwise described, it was carried to identify and to confirm compounds obtained by the following reactions by obtaining satisfactory proton nuclear magnetic resonance spectra, infrared spectra and mass spectra.

Synthetic Example 1

Synthesis of N'-(N-benzoylamidino)-benzoic Acid Hydrazide

A four neck flask (one liter) equipped with a thermometer and a stirrer was charged with 71.3 g (0.4 mole) of N'-amidinobenzoic acid hydrazide (CAS. 3679-92-3), 46.6 g (0.44 mole) of anhydrous sodium carbonate and 360 cc of dimethylformamide. Dropwise added thereto in about 2 hours was 59.0 g (0.42 mole) of benzoyl chloride under stirring while cooling so that the temperature was maintained at 20° C. or lower. After stirring at 20° C. (room temperature) for 12 hours, deposited crystals were filtered off, and the mother liquor was concentrated under reduced pressure. The resulting residue was dissolved in 100 cc of isopropyl alcohol, and the solution was slowly dropwise added to one liter of deionized water to deposit crystals. The resulting crystals were filtered off, sufficiently washed with deionized water and then dried under reduced pressure, whereby the intended compound (pale yellow crystals) was obtained.

The yielded amount in this reaction was 73.5 g (0.26 mole), and the yield thereof was 65%.

Synthetic Example 2

Synthesis of N-amidinobenzamide

A four neck flask (3 liters) equipped with a thermometer and a stirrer was charged with 573.2 g (6.0 mole) of guanidine hydrochloride and 1.5 liter of methanol and cooled to 20° C. Slowly dropwise added thereto was 324.1 g (6.0 mole) of sodium methoxide crystal at 20° C. or lower and stirred for 3 hours. Deposited crystals were filtered off. The mother liquor was charged to the four neck flask (3 liters) equipped with the above devices, and 337.4 g (2.4 mole) of benzoyl chloride was slowly dropwise added at 15° C. or lower and stirred for 12 hours. Deposited crystals were filtered off, and the mother liquor was concentrated under reduced pressure to obtain white crystals. The resulting crystals were sufficiently washed with 3 liters of deionized water and dried under reduced pressure, whereby the intended compound (white crystals) was obtained.

The yielded amount in this reaction was 292 g (1.79 mole), and the yield thereof was 75%.

Synthetic Example 3

Synthesis of 1-benzoylacetoamidine

A four neck flask (one liter) equipped with a thermometer and a stirrer was charged with 70.9 g (0.75 mole) of ethylacetoimidate hydrochloride (CAS. 2208-01-3) and 400 cc of dimethylformamide and cooled down to 0° C. or lower.

Added thereto was 79.5 g (0.75 mole) of anhydrous sodium carbonate, and subsequently 42.2 g (0.3 mole) of benzoyl chloride was slowly dropwise added under stirring so that the temperature was maintained at 0° C. or lower and stirred at 20° C. for 2 days. Deposited crystals were filtered off, and the mother liquor was concentrated under reduced pressure to obtain a residue. This residue was extracted with water 200 cc/toluene 200 cc, and the separated toluene layer was dehydrated with anhydrous magnesium sulfate. Magnesium sulfate was filtered off, and then toluene was distilled off under reduced pressure, followed by drying the residue under reduced pressure, whereby the intended compound was obtained.

The yielded amount in this reaction was 20.5 g (0.13 mole), and the yield thereof was 42%.

Synthetic Example 4

Synthesis of 2-benzoylaceto-hydrazideimine

A four neck flask (one liter) equipped with a thermometer and a stirrer was charged with 51.8 g (0.42 mole) of ethylacetoimidate hydrochloride and 500 cc of methanol. Added thereto was 46.6 g (0.44 mole) of anhydrous sodium carbonate under stirring at room temperature and stirred at room temperature for 3 hours. Deposited crystals were filtered off, and the mother liquor was charged to the four neck flask (one liter) equipped with the above devices. Slowly added was 54.4 g (0.4 mole) of benzoic acid hydrazide under stirring at room temperature and stirred for 12 hours. The reaction solution was concentrated under reduced pressure, and the resulting oily product was added to 300 cc of diethyl ether to deposit crystals. These crystals were washed with 100 cc of diethyl ether and dried under reduced pressure, whereby the intended compound (pale yellow crystals) was obtained.

The yielded amount in this reaction was 47.1 g (0.26 mole), and the yield thereof was 66%.

Synthetic Example 5

Synthesis of 1,5-dioctanoylcarbo-hydrazideimine

A four neck flask (2 liters) equipped with a thermometer and a stirrer was charged with 10.8 g (0.2 mole) of sodium methoxide and 800 cc of methanol and cooled to 20° C. or lower. Added thereto little by little under stirring was 25.1 g (0.2 mole) of 1,3-diaminoguanidine hydrochloride at 20° C.

or lower and stirred for 3 hours. Subsequently, 44.5 g (0.42 mole) of anhydrous sodium carbonate was added, and octanoic acid chloride was further dropwise added at 20° C. or lower, followed by stirring the solution at 20° C. for 12 hours. Deposited crystals were filtered off, and the crystals thus obtained were washed with 400 cc of deionized water and 200 cc of hexane and dried under reduced pressure, whereby the intended compound (white crystals) was obtained.

The yielded amount in this reaction was 47.1 g (0.14 mole), and the yield thereof was 69%.

Examples 1 to 10 and Comparative Examples 1 to 4

Rubber compositions blended according to recipes shown in the following Table 1 and Table 2 were kneaded by means of a Banbury mixer® and then turned into sheets (160 mm×160 mm) having a thickness of about 2 mm, followed by press-vulcanizing at 145° C. for 30 minutes.

The vulcanized rubbers obtained in Examples 1 to 10 and Comparative Examples 1 to 4 were subjected to a tensile test according to JIS K6301-1975 before heat aging and after heat aging in the air under the conditions of 100° C. for 48 hours to determine an elastic modulus in elongation by 100% and an elongation at break (%).

These results are shown in the following Table 1 and Table 2. Further, the structural formulas of chemicals A to E in Table 2 are shown below.

TABLE 1

| Blending recipe | (part by weight) |
| --- | --- |
| Natural rubber | 70 |
| Synthetic rubber *1 | 30 |
| Reinforcing filler *2 | 50 |
| Stearic acid | 2.0 |
| Zinc white | 3.0 |
| Antioxidant *3 | Table 2 |
| Various compounds (A) | Table 2 |
| Vulcanization-accelerator *3 | 1.0 |
| Sulfur | 1.2 |

*1 JSR BR01 (manufactured by JSR Corporation)
*2 ISAF grade carbon black
*3 Nocrac 6C (manufactured by Ouchishinko Chemical Industrial Co., Ltd.) N-(1,3-dimethylbutyl)-N'-phenyl-p-phenylene-diamine
*4 Nocceler CZ (manufactured by Ouchishinko Chemical Industrial Co., Ltd.)

TABLE 2

Numerals in parenthesis: charge rate before and after heat aging

| | Various compounds | Blending amount (part by weight) | | Before heat aging | | After heat aging | |
| --- | --- | --- | --- | --- | --- | --- | --- |
| | (A) of Formula (I) | Chemical F | Chemicals A to E | 100% elastic modulus (HB) | Elongation at break (%) | 100% elastic modulus (HB) | Elongation at break (%) |
| Comparative Example 1 | Not added | 0.00 | 0.00 | 1.77 | 549.7 | 2.18 (123) | 387.1 (70) |
| Example 1 | Chemical A | 0.00 | 1.00 | 1.70 | 566.2 | 2.30 (135) | 475.6 (84) |
| Example 2 | Chemical A | 0.00 | 2.00 | 1.65 | 579.9 | 2.13 (146) | 527.7 (91) |
| Comparative Example 2 | Not added | 1.00 | 0.00 | 2.18 | 527.8 | 3.18 (146) | 398.3 (75) |
| Comparative Example 3 | Not added | 2.00 | 0.00 | 2.42 | 521.7 | 4.42 (183) | 398.5 (76) |
| Comparative Example 4 | Not added | 5.00 | 0.00 | 1.94 | 571.1 | 3.94 (203) | 396.7 (69) |
| Example 3 | Chemical B | 1.00 | 1.00 | 2.31 | 542.6 | 2.84 (123) | 493.8 (91) |

TABLE 2-continued

Numerals in parenthesis: charge rate before and after heat aging

| | | Blending amount | Before heat aging | | After heat aging | |
|---|---|---|---|---|---|---|
| | Various compounds (A) of Formula (I) | (part by weight) | 100% elastic modulus (HB) | Elongation at break (%) | 100% elastic modulus (HB) | Elongation at break (%) |
| | | Chemical F | Chemicals A to E | | | |
| Example 4 | Chemical C | 1.00 | 1.00 | 2.21 | 525.8 | 2.78 (126) | 457.4 (87) |
| Example 5 | Chemical D | 1.00 | 1.00 | 2.32 | 540.9 | 2.95 (127) | 465.2 (86) |
| Example 6 | Chemical E | 1.00 | 1.00 | 2.23 | 527.6 | 2.88 (129) | 464.3 (88) |
| Example 7 | Chemical A | 1.00 | 1.00 | 2.08 | 543.6 | 2.52 (121) | 494.7 (91) |
| Example 8 | Chemical A | 1.00 | 2.00 | 2.02 | 556.8 | 2.38 (118) | 512.3 (92) |
| Example 9 | Chemical A | 1.00 | 3.00 | 1.98 | 570.0 | 2.30 (116) | 530.1 (93) |
| Example 10 | Chemical A | 1.00 | 0.50 | 2.14 | 535.7 | 2.82 (132) | 455.3 (85) |

A to F in Table 2 show the following:

Chemical A: N'-(N-benzoylamidino)benzoic acid hydrazide

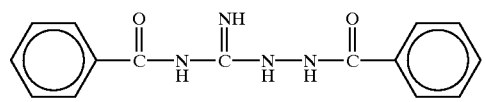

Chemical B: N-amidinobenzamide

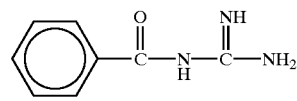

Chemical C: 1-benzoylacetoamidine

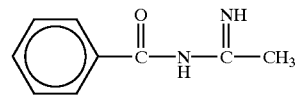

Chemical D: 2-benzoylacetohydrazideimine

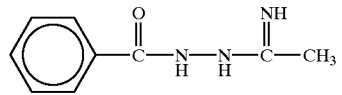

Chemical E: 1,5-dioctanoylcarbohydrazideimine

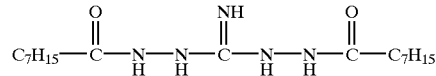

Chemical F: N-(1,3-dimethylbutyl)-N'-phenyl-p-phenylenediamine (Nocrac 6C)

Comments on Table 1 and Table 2

As apparent from the results shown in Table 1 and Table 2, it has been found that the elastic modulus in elongation by 100% is excellent and the elongation at break rupture extension is high after heat aging in Examples 1 to 10 falling in the scope of the present invention as compared with Comparative Examples 1 to 4 falling outside the scope of the present invention.

It has been found as well that the rubber composition having excellent heat aging resistance is obtained by using the compounds described above of the present invention. Further, it has been found that the rubber composition having better heat aging resistance is obtained by using the compound (A) in combination with a diphenyldiamine base antioxidant.

What is claimed is:

1. A rubber composition comprising 100 parts by weight of a rubber component comprising at least one rubber selected from the group consisting of natural rubber and synthetic rubbers and 0.05 to 20 parts by weight of at least one compound (A) selected from compounds represented by the following Formula (II):

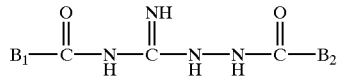

(II)

wherein $B_1$ and $B_2$ each represent

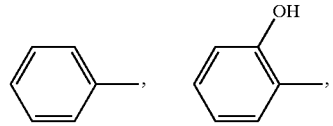

a hydrogen atom or an alkyl group having 1 to 18 carbon atoms which may be branched, and $B_1$ and $B_2$ may be the same or different.

2. The rubber composition as described in claim 1, wherein the compound represented by Formula (II) is N'-(N-benzoylamidino)benzoic acid hydrazide.

3. The rubber composition as described in claim 1, further comprising an antioxidant, wherein said antioxidant is at least one selected from the group consisting of antioxidants of a naphthylamine base, a p-phenylenediamine base, a hydroquinone derivative, a monophenol base, a bisphenol base, a trisphenol base, a polyphenol base, a diphenylamine base, a quinoline base, a thiobisphenol base and a hindered phenol base.

4. The rubber composition as described in claim 3, wherein the antioxidant is at least one selected from the group consisting of antioxidants of a p-phenylenediamine base and a diphenylamine base.

5. The rubber composition as described in claim 3, wherein an amount of the antioxidant is 0.1 to 5.0 parts by weight per 100 parts by weight of the rubber component.

* * * * *